United States Patent [19]

Watts et al.

[11] Patent Number: 5,070,114

[45] Date of Patent: Dec. 3, 1991

[54] ISOCYANATE COMPOSITION AND PROCESS FOR MAKING FLEXIBLE FOAMS THEREFROM

[75] Inventors: Arun Watts, Brussels; Louis Muller, Ottenburg; Gabriel Verhelst, Herent; Mireille De Witte, Gent; Tu Pham, Grez-Doiceau; Alain Parfondry, Evere, all of Belgium

[73] Assignee: Imperial Chemical Industries PLC, London, England

[21] Appl. No.: 508,726

[22] Filed: Apr. 16, 1990

[30] Foreign Application Priority Data

Apr. 14, 1989 [GB] United Kingdom ............... 8908490

[51] Int. Cl.$^5$ .............................................. C08G 18/14
[52] U.S. Cl. ........................................ 521/159; 528/67
[58] Field of Search ........................... 521/159; 528/67

[56] References Cited

U.S. PATENT DOCUMENTS 4,133,014  9/1978  Kubens et al. ..................... 528/67
4,788,269  11/1988  Vu et al. ............................. 528/67

Primary Examiner—Maurice J. Welsh
Attorney, Agent, or Firm—Cushman, Darby & Cushman

[57] ABSTRACT

The invention relates to a liquid isocyanate-containing prepolymer composition having an average isocyanate functionality greater than 2 and an NCO content of from 2 to 15% by weight, as obtainable by reacting an isocyanate reactive polymer having an average nominal functionality of from 2 to 6 with a stoichiometric excess of a diphenylmethane diisocyanate composition containing at least 2% by weight of 2,4'-diphenylmethane diisocyanate and having an average isocyanate functionality in the range from 2 to 2.3. The invention also relates to a method for preparing a polyurethane foam, which comprises reacting such a prepolymer composition with water.

11 Claims, No Drawings

ISOCYANATE COMPOSITION AND PROCESS FOR MAKING FLEXIBLE FOAMS THEREFROM

This invention relates to prepolymers and more especially to isocyanate-containing polyurethane prepolymers useful in the production of polyurethane foams.

Isocyanate-containing polyurethane prepolymers obtained by reacting a stoichiometric excess of an organic polyisocyanate with an organic polyol are well known in the field of polyurethanes and have been used, for example, in the production of solid and microcellular elastomers, flexible and rigid foams, coatings, adhesives and the like. Thus, essentially difunctional prepolymers having low free isocyanate contents obtained by reacting tolylene diisocyanate (TDI) or diphenylmethane diisocyanate (MDI) with a polyester or polyether diol have been used in the preparation of elastomers. On the other hand, prepolymers having high free isocyanate contents obtained by reacting various diols with 4,4'-diphenylmethane diisocyanate have been manufactured as a means of providing this normally solid diisocyanate in a convenient liquid form.

The production of foamed materials based on polyurethane and other polymer systems derived from organic polyisocyanates is well established. Depending upon the formulations used in their manufacture, the products can vary in texture from the soft flexible foams used as cushioning materials to the rigid foams used as insulating structural materials. Similarly, depending upon the amount of blowing agent used, products having densities varying between about 10 and about 1100 kg/m³ can be made.

Flexible polyurethane foams have been manufactured for more than thirty years from organic polyisocyanates and polymeric polyols. Water, which reacts with isocyanates to form carbon dioxide (and urea linkages), has been employed as the principal blowing agent. The polyisocyanate most commonly used in the production of flexible foam has been tolylene diisocyanate (TDI) but recent years have seen an increasing use of diphenylmethane diisocyanates (MDI). The polyols originally used in flexible foam production were slightly branched polyesters such as poly(diethylene adipates) but most flexible foam production is now based upon polyether polyols, especially triols, having hydroxyl equivalent weights of from about 750 to about 5000.

Interaction between the polyisocyanate and the isocyanate-reactive components, the polyol and water, can be brought about in various ways. In the so-called "one-shot" process, the aforementioned materials are combined at room temperature in a single reaction step, the polyisocyanate reacting substantially simultaneously with the polyol and water to form the foam. At the other extreme is the prepolymer process which involves reacting the polyisocyanate with the polyol, usually at an elevated temperature, to form a prepolymer containing free isocyanate and then foaming the cooled prepolymer in a quite distinct reaction step by reacting it with water. Between these two extremes is the semi- or quasi-prepolymer method which involves reacting the polyisocyanate with a portion of the polyol to form a relatively low viscosity prepolymer which is subsequently reacted with the water and the remainder of the polyol.

Whilst the lower volatility of MDI relative to TDI is an advantage from the industrial hygiene point of view, a limitation of MDI based flexible foam systems has been the difficulty experienced in producing low density foams (below 30 kg/m³ without using auxiliary blowing agents, especially chlorofluorocarbons such as trichlorofluoromethane. This problem is aggravated by the use of the prepolymer process since this brings about a dilution of the isocyanate content of the MDI. In view of international agreement that the use of chlorofluorocarbons should be reduced, it is clearly undesirable that flexible foam formulations should contain significant amount of such blowing agents.

The isocyanate index (ratio of isocyanate groups to isocyanate-reactive groups expressed as a percentage) in TDI based flexible foam formulations is usually between 80 and 110, typically 103-108 but, recently, halocarbon-free MDI based one-shot formulations have been proposed having much lower indices, for example below 60. Whilst these formulations allow low density foams to be made despite the absence of halocarbon blowing agent, some of the physical properties of the foams, for example tear strength, do not reach the levels achieved by TDI in the one-shot process.

It has now been found that flexible foams, including those having low densities, can be prepared from the MDI prepolymer compositions according to this invention, using water as substantially the sole blowing agent under the conditions hereinafter described.

The present invention provides a liquid isocyanate-containing prepolymer composition having an average isocyanate functionality greater than 2 and an NCO content of from 2 to 15% by weight, preferably 2 to 12% by weight as obtainable by reacting an isocyanate reactive polymer having an average nominal functionality of from 2 to 6, preferably from 2 to 4, and an average equivalent weight of from about 500 to 5000 with a stoichiometric excess of a diphenylmethane diisocyanate composition containing at least 2% by weight of 2,4'-diphenylmethane diisocyanate and having an average isocyanate functionality in the range from 2 to 2.3.

More narrowly, the present invention provides a preferred stable liquid isocyanate-containing polyurethane prepolymer composition having an average isocyanate functionality greater than 2 and an NCO content of from 2 to 15% by weight obtained by reacting:

(i) a polyol component comprising at least one polyoxyalkylene polyol containing oxyethylene residues, said polyol component having an average nominal functionality of from 2 to 6, an average hydroxyl equivalent weight of from about 500 to about 5000 and an average oxyethylene content of from 5 to 30% on a weight basis of total oxyalkylene residues, preferably from 10 to 25%, and (ii) a stoichiometric excess, relative to the polyol component, of a diphenylmethane diisocyanate composition containing at least 2% by weight of 2,4'-diphenylmethane diisocyanate on a weight basis of diisocyanate components, and having an average isocyanate functionality in the range from 2 to 2.3.

Most specifically, the present invention provides an even more preferred stable liquid isocyanate-containing prepolymer composition as obtainable by reacting an isocyanate-reactive polyoxyalkylene polymer with a diphenylmethane diisocyanate containing composition, characterised by an average isocyanate functionality of the prepolymer composition greater than 2, preferably in the range from 2.05 to 2.4;

an—NCO content of the prepolymer composition of from 2 to 12% by weight, preferably of from 5 to 12% by weight;

an oxyethylene content in the isocyanate reactive polyoxyalkylene polymer in the range from 5 to 30% on a weight basis of total oxyalkylene residues;

an average nominal functionality of the isocyanate reactive polyoxyalkylene polymer of from 2 to 6;

a total diphenylmethane diisocyanate content in the diphenylmethane diisocyanate—containing composition of at least 60% by weight;

a 2,4' diphenylmethane diisocyanate isomer content in the diphenylmethane diisocyanate—containing composition of at least 5%;

an average isocyanate functionality of the diphenylmethane diisocyanate—containing composition of from 2 to 2.3, preferably of from 2.1 to 2.3.

The present invention furthermore provides a method for the preparation of a flexible polymeric foam which comprises reacting 100 parts by weight of a polyisocyanate component with from 1 to 10 parts by weight of an isocyanate-reactive component comprising at least 95% by weight of water in the substantial absence of halocarbon blowing agent, the polyisocyanate component comprising an isocyanate-terminated prepolymer composition according to the invention.

The isocyanate-reactive polymer used in the preparation of the prepolymer has an average nominal functionality of 2 to 6. The term "nominal functionality" refers to the functionality, with respect to isocyanates, that an isocyanate-reactive polymer would be expected to have having regard to its monomeric components. For example, a polyether prepared by the addition of propylene oxide to a glycol will have a nominal (hydroxyl) functionality of 2 although, in fact, its average functionality will be somewhat less than 2. Thus, for a polyether polyol, the average nominal functionality is the average functionality (number of active hydrogen atoms) of the initiator or initiators used in its preparation.

The average nominal functionality of the isocyanate-reactive polymer is preferably 2 to 3. Preferred average equivalent weights lie in the range from 1000 to 4000. Mixtures of two or more isocyanate-reactive polymers varying in functionality, equivalent weight and/or chemical constitution (end groups or backbone) may be used provided such mixtures conform to the average functionality and average equivalent weight criteria specified herein.

Isocyanate-reactive groups which may be present in the isocyanate-reactive polymer include primary amine, secondary amino, thiol, carboxy, enamino and, especially, hydroxyl groups.

Particularly important isocyanate-reactive polymers include polymeric polyols. Suitable polyols and methods for their preparation have been fully described in the prior art and, as examples of such polyols, there may be mentioned polyesters, polyesteramides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Random copolymers having oxyethylene contents of 10-80%, block copolymers having oxyethylene contents of up to 25% and random/block copolymers having oxyethylene contents of up to 50%, based on the total weight of oxyalkylene units may be mentioned. Mixtures of the said diols and triols can be particularly useful. Other particularly useful polyether polyols include polytetramethylene glycols obtained by the polymerisation of tetrahydrofuran.

A particularly interesting category of polyol components consists of polyether polyols having an average oxyethylene content of from 10 to 25% by weight of total oxyalkylene residues due to the presence therein of at least one polyoxyalkylene polyol containing oxyethylene (ethylene oxide) residues. Preferred polyol components comprise at least one poly(oxyethylene-oxypropylene) polyol each having an oxyethylene content in the range from 10 to 25% on a weight basis of total oxyalkylene residues. Other useful polyol components in this category contain a mixture of polyols including polyols, for example poly(oxyethylene-oxypropylene) polyols, polyoxypropylene polyols and/or polyoxyethylene polyols, having oxyethylene contents outside the 10 to 25% range provided the overall oxyethylene content of the component is within the specified range. Such mixtures may optionally contain one or more poly(oxyethylene-oxypropylene) polyol having an oxyethylene content in the 10 to 25% range. In addition to the possibility of using mixtures of polyols varying in oxyethylene content, mixtures of two or more polyols varying in functionality, equivalent weight and/or polymer backbone may be used provided such mixtures conform to the average functionality and average equivalent weight criteria specified herein.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols.

Other polyols which may be used comprise dispersions or solutions of addition or condensation polymers in polyols of the types described above. Such modified polyols, often referred to as "polymer" polyols have been fully described in the prior art and include products obtained by the in situ polymerisation of one or more vinyl monomers, for example styrene and acrylonitrile, in polymeric polyols, for example polyether polyols, or by the in situ reaction between a polyisocyanate and an amino- or hydroxy-functional compound, such as triethanolamine, in a polymeric polyol.

The polymer modified polyols which are particularly interesting for preparing isocyanate-containing prepolymers in accordance with the invention are products obtained by in situ polymerization of styrene and/or acrylonitrile in poly(oxyethylene/oxypropylene) polyols having functionalities of 2-4, equivalent weights of 750-3000 and ethylene oxide contents of 5-50%, preferably 5-30% on a weight basis of total oxyalkylene residues, and products obtained by in situ reaction between a polyisocyanate and an amino or hydroxy-functional compound (such as triethanolamine) in a poly(oxyethylene/oxypropylene) polyol having a functionality of 2-4, and equivalent weight of 750-3000 and an ethylene oxide content of 5-50%, preferably 5-30% on a weight basis of total oxyalkylene residues.

Polyoxyalkylene polyols containing from 5 to 50% of dispersed polymer are particularly useful. Particle sizes of the dispersed polymer of less than 50 microns are preferred.

Other useful isocyanate-reactive polymers for preparing the prepolymers include polymeric polyamines, especially diamines and triamines, corresponding to the above described polymeric polyols. Suitable polyamines of polyether polyols as described, for example, in U.S. Pat. No. 3,654,370 or by the cyanoethylation of polyols followed by hydrogenation. Polyoxypropylene diamines and triamines and mixtures thereof are preferred. Also useful are polymers containing both amino and hydroxyl groups obtained by the partial amination of polyols.

Further isocyanate-reactive polymers which may be used in preparing the prepolymers include imino-functional polymers. Such polymers have been described in U.S. Pat. No. 4,794,129 together with methods for their preparation and include polymers terminating in imine, oxazoline, imidazoline, N-alkyl imidazoline, oxazine, diazine, imino-ester, amidine, imidine, isourea and guanidine groups. The preferred imino-functional polymers are imine-terminated polyethers such as may be obtained, for example by reacting a polyether polyamines, especially a polyoxypropylene diamine or triamine, with an aldehyde or ketone.

Enamine functional polymers may be prepared either from secondary amine terminated resins (i.e. polyethers) by reaction with ketones/aldehydes having one or more alpha hydrogens, or by reacting ketone/aldehydes terminated resins (bearing alpha hydrogens) with secondary amines, providing for removal of the $H_2O$ formed in the reactions. Secondary amine terminated resins can be obtained, for example by catalytic hydrogenation of the imino-functional polymers described hereinabove. Ketone/aldehyde terminated resins may be obtained, in general, by oxidation of the corresponding secondary or primary hydroxyl terminated resin. More highly enamine functional polymers can be prepared by oxidising a primary hydroxy functional resin to the corresponding polycarboxylic acid, conversion of the said groups to orthoesters, end treatment of the latter, with an excess of a secondary amine. Each orthoester must contain at least one alpha hydrogen atom.

Diphenylmethane diisocyanate compositions which may be used in the preparation of the prepolymer include unmodified diphenylmethane diisocyanates containing at least 2% by weight of the 2,4'-isomer and preferably containing at least 60% by weight of the 4,4'-isomer. Suitable isocyanates therefore include isomer mixtures containing at least 2% but not more than 40%, preferably not more than 30%, and more preferably not more than 20%, by weight of the 2,4'-isomer and not more than 5% by weight of the 2,2'-isomer. Other suitable diphenylmethane diisocyanate compositions include modified forms of these diphenylmethane diisocyanates, that is to say MDI modified in known manner by the introduction of urethane, allophanate, urea, biuret, carbodiimide, uretonimine or isocyanurate residues. These so-called MDI variants particularly include uretonimine-modified MDI having NCO contents of at least 25% by weight and polyether-based prepolymers having NCO contents of at least 20% by weight.

Diphenylmethane diisocyanate compositions containing MDI and polymeric fillers may also be used in the preparation of the prepolymer. Such products include polyurea dispersions in MDI such as have been described, for example, in EP-A-0 103 996, the disclosure of which is to be considered incorporated herein by reference. Other compositions containing polymeric fillers include prepolymers based on MDI and the above mentioned "polymer" polyols containing dispersed polymer particles. In these products, it is generally preferred that the dispersed polymer particles have an average particle size of less than 50 microns.

Further diphenylmethane diisocyanate compositions which may be used in the preparation of the prepolymers include compositions containing polymethylene polyphenylene polyisocyanates. Thus, mixtures may be used containing at least 50% by weight of pure MDI and up to 50% by weight of the so-called polymeric MDI containing from 35 to 65% by weight of diisocyanates, the remainder being largely polymethylene polyphenylene polyisocyanates having isocyanate functionalities greater than 2. Mixtures may also be used of pure MDI and polymeric MDI compositions containing higher proportions (up to 100%) of the said higher functionality polyisocyanates.

Still further diphenylmethane diisocyanate compositions which may be used in preparing the prepolymer include mixtures of the above described MDI types and up to 20% by weight of another polyisocyanate or mixture of polyisocyanates. Other polyisocyanates which may be used in admixture with the MDI include aliphatic, cycloaliphatic and araliphatic polyisocyanates, especially diisocyanates, for example hexamethylene diisocyanate, isophorone diisocyanate, cyclohexane- 1,4-diisocyanate, 4,4'-dicyclohexylmethane diisocyanates and m- and p-tetramethylxylene diisocyanates and, especially, aromatic polyisocyanates such as tolylene diisocyanates, phenylene diisocyanates and MDI compositions.

Any of the above mentioned diphenylmethane diisocyanate compositions, or any mixture thereof, may be used in the preparation of the prepolymer provided that the overall 2,4'-MDI content is at least 2% by weight and provided also that the overall isocyanate functionality is in the range 2 to 2.3.

The isocyanate-terminated prepolymer may be prepared by reacting the diphenylmethane diisocyanate composition with the isocyanate-reactive polymer under conditions that have been fully described in the prior art for the preparation of prepolymers. Reaction temperatures of about 40° C. to about 90° C. are generally suitable for the preparation of urethane group-containing prepolymers from polyols or urea group-containing prepolymers from polyamines but, if desired, the reaction may be continued under known conditions so as to convert urethane groups to allophanate groups and urea groups to biuret groups. To achieve a final NCO content within the specified range, an initial ratio of isocyanate to isocyanate-reactive groups (for example NCO/OH) would typically be within the range from 3:1 to 20:1. Preferred prepolymers are made by reacting the starting materials at initial ratio of isocyanate to isocyanate-reactive groups in the range from 3.5:1 to 15:1, especially 4:1 to 10:1, to give prepolymers having NCO contents of 4 to 12%.

The isocyanate-terminated prepolymer compositions according to the invention may further be blended with other polyisocyanate compostions, in particular further diphenylmethane diisocyanate compositions as mentioned for the preparation of the isocyanate-terminated prepolymer compositions. Such blends also constitute isocyanate-terminated prepolymer compositions according to the invention.

In order to prepare a prepolymer having an average isocyanate functionality greater than 2, it is necessary to use a reaction mixture containing at least one prepolymer precursor having a functionality greater than 2, said precursors being selected from the polyols and diphenylmethane diisocyanate compositions defined above, or to increase the functionality of the prepolymer by converting a proportion of urethane groups to allophanate groups. The selection of reaction components and/or reaction conditions capable of providing a prepolymer of the invention having an average isocyanate functionality greater than 2 will present no difficulty to a person skilled in the art.

The prepolymer compositions of the invention are particularly interesting to incorporate therein solid particulate materials such as fillers and/or more particularly solid flame retardants.

The most suitable prepolymer compositions of the invention for this particular purpose are those compositions which result from using polyols containing dispersed polymer particles (as described above) and/or diphenylmethane diisocyanate compositions containing dispersed polyurea particles, as described above.

The invention thus provides a liquid isocyanate-containing prepolymer composition having an —NCO content of from 2 to 12% by weight (preferably of from 5–12% by weight), and an average isocyanate functionality greater than 2, which composition comprises from 5 to 50% by weight of dispersed polymer and 5 to 100 parts by weight of solid flame retardant particles for 100 parts by weight of isocyanate-containing prepolymer composition.

Particularly interesting solid flame retardant agents include melamine.

The prepolymer compositions of the invention are liquid compositions having low vapour pressures. They may be used in the manufacture of flexible foams, especially cold-curing, low density flexible foams having high resilience combined with excellent tear and tensile properties. To effect foam formation, the isocyanate-terminated prepolymer is reacted with water in the presence as necessary of conventional additives. Such additives include catalysts, for example tertiary amines and tin compounds, surface-active agents and foam stabilisers, for example siloxane-oxyalkylene copolymers, chain extenders, for example low molecular weight diols, diamines and di-imines, crosslinking agents, for example triethanolamine, flame retardants, organic and inorganic fillers, pigments and internal mould release agents. Moulded or slabstock foam may be prepared from the prepolymers using continuous or discontinuous production techniques.

In a preferred method of making foams from the prepolymers of the invention, 100 parts by weight of a polyisocyanate component comprising the prepolymers of the invention is reacted with from 1 to 10 parts by weight of an isocyanate-reactive component in which the isocyanate-reactive species consist for at least 95% by weight of water.

In many cases, water will be the sole isocyanate-reactive species present in the isocyanate-reactive component. In addition to containing water, however, the isocyanate-reactive component may also contain up to 5% by weight of one or more further isocyanate-reactive compounds.

The method of the invention may be performed to produce moulded or slabstock foam by mixing the components of the foam-forming reaction mixture continuously or discontinuously in any convenient manner.

The invention is illustrated but not limited by the following Examples in which all parts and percentages are by weight unless otherwise stated.

The following glossary of materials is included to identify reaction components not otherwise identified in the Examples.

GLOSSARY

1. Polyol A: A propylene oxide/ethylene (weight ratio about 86/14) polyether triol of OH-value 32.
2. Polyol B: A propylene oxide/ethylene oxide polyether triol of OH-value 36, containing partially random distributed and partially block distributed ethylene oxide, the overall weight ratio of propylene oxide to ethylene oxide being about 85/15.
3. Polyol C: A polymer polyol containing about 16% by weight ethylene oxide on ethylene—propylene oxide residues, having an OH-value of 28, commercially available as Polyurax U2603 from BP/DOW.
4. Polyol D: A propylene oxide/ethylene oxide (weight ratio 87/13) polyether triol of OH-value 36.
5. Polyol E: A propylene oxide/ethylene oxide (weight ratio about 80/20) polyether diol of OH-value 28.
6. Polyol F: A propylene oxide/ethylene oxide (weight ratio about 88/12) polyether triol of OH-value 24.
7. Polyol G: A propylene oxide/ethylene oxide polyether triol of OH-value 28, having a random propylene oxide-ethylene oxide distribution in a weight ratio of about 87/13.
8. Polyol H: A propylene oxide/ethylene oxide polyether triol of OH-value 35, having a random propylene oxide/ethylene oxide distribution in a weight ratio of about 76/24.
9. Polyol I: A propylene oxide/ethylene oxide (weight ratio about 78:22) polyether triol of OH-value 43.
10. Isocyanate ML: Suprasec ML, and MDI-composition available from ICI, containing about 20% 2,4' MDI-isomer.
11. Isocyanate W: The reaction product of Suprasec ML with Isophorone diamine containing about 10% urea-particles and having an NCO value of 26.9%.
12. Isocyanate X: A polymeric MDI-composition containing about 83 % diisocyanates of which about 9.5% is 2,4' isomer.
13. Isocyanate Z: A polymeric MDI-composition containing about 83% diisocyanates of which about 18% is 2,4' isomer.
13.' Isocyanate Y: A polymeric MDI-composition containing about 90 % diisocyanates of which about 19% is 2,4' isomer.
14. Catalyst Niax A1: A tertiary amine catalyst available from Union Carbide Corp.
15. Catalyst Dabco 33LV: A tertiary amine catalyst available from Air Products.

EXAMPLES 1-5

Preparation of Isocyanate Prepolymer Compositions.

Polyisocyanate I is an isocyanate prepolymer composition having an NCO-content of 9.2%, a viscosity of 38 Ps at 25° C. and prepared by reacting 675 parts of polyol A with 325 parts of isocyanate Z at 80° C.

Polyisocyanate II is an isocyanate prepolymer composition having an NCO-content of 7.8%, a viscosity of 74 Ps at 25° C. and prepared by reacting 704 parts of polyol B with 296 parts of isocyanate Y at 80° C.

Polyisocyanate III is an isocyanate prepolymer composition having an NCO-content of 8.7%, a viscosity of 66 Ps at 25° C. and prepared by reacting 675 parts of polyol D with 325 parts of isocyanate X at 80° C.

Polyisocyanate IV is an isocyanate prepolymer composition having an NCO-content of 8.8%, a viscosity of 133 Ps at 25° C. and is prepared by first reacting 680 parts of polyol C with 220 parts of isocyanate ML at 80° C. and than blended with 100 parts of crude MDI.

Polyisocyanate V is an isocyanate prepolymer composition having an NCO-content of 11.3%, a viscosity of 97 Ps at 25° C. and is prepared by first reacting 254 parts of isocyanate W with 546 parts of polyol A at 80° C. and than blended with 200 parts of crude MDI.

EXAMPLES 6-10

Foam Preparation

The flexible foam samples 1-4 were prepared by mixing polyisocyanate I-IV with a catalyst-H₂O blend, as indicated in table 1, giving good quality flexible foam.

The flexible foam sample 5 was prepared by feeding MDI-polyisocyanate V, catalyst and H₂O into a multi-component low pressure mixing head, in the proportions indicated in table 1. A flexible foam with good quality was obtained.

The amounts stated in table 1A are in parts by weight. Table 1B provides the foam properties of the obtained samples.

TABLE 1A

| N° | 1 | 2 | 3 | 4 | 5 |
|---|---|---|---|---|---|
| Polyisocyanate | | | | | |
| I | 156 | | | | |
| II | | 180 | | | |
| III | | | 100 | | |
| IV | | | | 159 | |
| V | | | | | 100 |
| H₂O | 5 | 5 | 3.8 | 5 | 4 |
| Niax A-1 | 0.25 | 0.25 | 0.20 | 0.25 | 0.20 |
| Dabco 33LV | | | 0.40 | | |

TABLE 1B

| N° | 1 | 2 | 3 | 4 | 5 |
|---|---|---|---|---|---|
| Foam Density (kg/m³) ISO 1855 | 48 | 62 | 49 | 46 | 20 |
| Compr. Hardn. 40% (kPa) ISO 3386 | 5.6 | 6.6 | 3.8 | 10.5 | 2.4 |
| Tear Strength max (N/m) ISO 8067 | 330 | | | 365 | 175 |
| Elongation (%) ISO 1798 | 132 | | | 70 | 110 |

EXAMPLES 11-16

Preparation of Isocyanate Prepolymer Compositions

Isocyanate prepolymers were prepared by reacting isocyanate ML with polyols B and E-I.

The respective amounts of isocyanate and polyol reacted with each other are stated in Table 1 herebelow. The reaction took place at 80° C. under conventional mixing conditions. The resulting NCO-content and viscosity of the obtained prepolymers is given in Table 2.

TABLE 2

| | Prepolymer Composition | | | | | |
|---|---|---|---|---|---|---|
| | 11 | 12 | 13 | 14 | 15 | 16 |
| Isocyanate | ML | ML | ML | ML | ML | ML |
| weight (%) | 24.7 | 23.7 | 24.4 | 25.9 | 25.6 | 26.6 |
| Polyol | E | F | G | B | H | I |
| weight (%) | 75.3 | 76.3 | 75.6 | 74.1 | 74.4 | 73.4 |
| NCO-value (%) | 6.6 | 6.6 | 6.5 | 6.6 | 6.6 | 6.6 |
| viscosity (PS/25° C.) | 40 | 55 | 83 | 74 | 73 | 121 |

We claim:
1. A liquid isocyanate-containing prepolymer composition having an average isocyanate functionality greater than 2 and an NCO content of from 2 to 12% by weight, as obtainable by reacting an isocyanate reactive polymer having an average nominal functionality of from 2 to 4 and an average equivalent weight of from about 500 to about 5000, with a stoichiometric excess of a diphenylmethane diisocyanate composition containing at least 2% by weight of 2,4'-diphenylmethane diisocyanate and having an average isocyanate functionality in the range from 2 to 2.3.
2. A liquid isocyanate-containing polyurethane prepolymer having an average isocyanate functionality greater than 2 and an NCO content of from 2 to 15% by weight as obtainable by reacting:
(i) a polyol component comprising at least one polyoxyalkylene polyol containing oxyethylene residues, said polyol component having an average nominal hydroxyl functionality of from 2 to 6, an average hydroxyl equivalent weight of from about

500 to about 5000 and an average oxyethylene content of from 10 to 25% on a weight basis of total oxyalkylene residues, and (ii) a stoichiometric excess, relative to the polyol component, of a diphenylmethane diisocyanate composition containing at least 2% by weight of 2,4'-diphenylmethane diisocyanate on a weight basis of diisocyanate components and having an average isocyanate functionality in the range from 2 to 2.3.

3. A liquid isocyanate-containing prepolymer composition as obtainable by reacting an isocyanate-reactive polyoxyalkylene polymer with a diphenylmethane diisocyanate containing composition, characterised by an average isocyanate functionality of the prepolymer composition greater than 2;

an —NCO content of the prepolymer composition of from 2 to 12% by weight;

an oxyethylene content in the isocyanate reactive polyoxyalkylene polymer in the range from 5 to 30% on a weight basis of total oxyalkylene residues;

an average nominal functionality of the isocyanate reactive polyoxyalkylene polymer of from 2 to 6;

a total di-phenylmethane diisocyanate content in the diphenylmethane diisocyanate—containing composition of at least 60% by weight;

a 2,4' diphenylmethane diisocyanate isomer content in the diphenylmethane diisocyanate—containing composition of at least 5%;

an average isocyanate functionality of the diphenylmethane diisocyanate—containing composition of from 2 to 2.3.

4. A liquid isocyanate-containing prepolymer composition as obtainable by reacting an isocyanate-reactive polyoxyalkylene polymer with a diphenylmethane diisocyanate containing composition, and blending the obtained product with a further diphenylmethane diisocyanate composition, characterised by:

an average isocyanate functionality of the prepolymer composition greater than 2;

an —NCO content of the prepolymer composition of from 2 to 12% by weight;

an oxyethylene content in the isocyanate reactive polyoxyalkylene polymer in the range from 5 to 30% on a weight basis of total oxyalkylene residues;

an average nominal functionality of the isocyanate reactive polyoxyalkylene polymer of from 2 to 6;

a total diphenylmethane diisocyanate content in the diphenylmethane diisocyanate—containing composition of at least 60% by weight;

a 2,4' diphenylmethane diisocyanate isomer content the diphenylmethane diisocyanate—containing composition of at least 5%;

an average isocyanate functionality of the diphenylmethane diisocyanate—containing composition of from 2 to 2.3.

5. A prepolymer composition according to claim 3 or 4 characterised in that the isocyanate reactive polyoxyalkylene polymer is a poly(oxyethylene/oxypropylene) polyol having a oxyethylene content in the range from 10 to 25% on a weight basis of total oxyethylene plus oxypropylene residues, and having a proportion of primary hydroxyl end groups of at least 40%, preferably from 50 to 90%.

6. A prepolymer composition according to claim 3 or 4 characterised in that the diphenylmethane diisocyanate-containing composition contains from 35 to 65% by weight of polymethylene polyphenylene polyisocyanates having isocyanate functionalities of 3 and more.

7. A prepolymer composition according to claim 1. 2, 3 or 4 characterised in that it contains from 5 to 50% by weight, based on the weight of isocyanate-containing prepolymer composition of a dispersed addition or condensation polymer.

8. A prepolymer composition according to claim 7, characterised in that it furthermore comprises from 5 to 100 parts by weight for 100 parts by weight of isocyanate-containing prepolymer composition, of a dispersed solid flame retardant agent.

9. A method for preparing a polyurethane foam, which comprises reacting a prepolymer composition according to claim 1, 2, 3, 4, 7 or 8 with water.

10. A method for preparing a polyurethane foam, which comprises reacting a prepolymer composition according to claim 1, 2, 3, 4, 7 or 8 with an isocyanate reactive component in which the isocyanate-reactive species consist for at least 95% by weight of water.

11. A composition as claimed in claim 3 or claim 4 wherein the average isocyanate functionality of the prepolymer composition is in the range from 2.05 to 2.4; the —NCO content of the prepolymer composition is from 5 to 12% by weight and the average isocyanate functionality of the diphenyl-methane diisocyanate-containing composition is from 2.1 to 2.3.

* * * * *